US005292298A

United States Patent [19]

Scannell

[11] Patent Number: 5,292,298

[45] Date of Patent: Mar. 8, 1994

[54] HEAT TRANSFER ROLL

[75] Inventor: Daniel B. Scannell, Valparaiso, Ind.

[73] Assignee: Roll Service Incorporated, South Holland, Ill.

[21] Appl. No.: 1,757

[22] Filed: Jan. 6, 1993

[51] Int. Cl.[5] ..... B23P 15/00

[52] U.S. Cl. ..... 492/46; 492/49

[58] Field of Search ..... 492/46, 43, 44, 47, 492/49; 165/89, 90, 91, 147, 168

[56] References Cited

U.S. PATENT DOCUMENTS

| | | | |
|---|---|---|---|
| 3,058,731 | 10/1962 | Bloom | 492/46 |
| 4,071,081 | 1/1978 | Chielens et al. | 492/46 |
| 4,285,107 | 8/1981 | Kustus et al. | 492/46 |
| 4,593,744 | 6/1986 | Lewis et al. | 492/46 |
| 4,631,792 | 12/1986 | Wesemann | 492/46 |
| 4,683,627 | 8/1987 | Reinhold | 492/46 |
| 4,711,291 | 12/1987 | Reinhold | 492/46 |
| 4,781,795 | 11/1988 | Miller | 492/46 |
| 4,955,268 | 9/1990 | Ickinger et al. | 492/46 |

FOREIGN PATENT DOCUMENTS

| | | | |
|---|---|---|---|
| 9054452 | 3/1984 | Japan | 492/46 |
| 1118304 | 5/1989 | Japan | 492/46 |
| 2099686 | 4/1990 | Japan | 492/46 |
| 2121919 | 1/1984 | United Kingdom | 492/46 |

*Primary Examiner*—Irene Cuda

*Attorney, Agent, or Firm*—Patnaude, Videbeck & Marsh

[57] ABSTRACT

A heat transfer roll has first and second disc-shaped outer end sections each having a centrally located tubular shaft. An inner tubular body is fitted over the two outer end sections, and a plurality of spiral ribs extend from the first end to the second end around the inner tubular body, and an outer tubular shell is fitted over the spiral ribs to form a plurality of spiral channels. Each of the end sections have one or more passageways therein which are in communication with the bore through the tubular shaft and the spiral channels. One of the outer end sections is adapted to receive a plurality of removable plugs, such that each removable plug when inserted will block the flow of liquid to one of the spiral channels. To clean such a heat transfer roll, all but one channel may be closed such that the remaining open channel may be cleaned.

9 Claims, 5 Drawing Sheets

FIG. 3
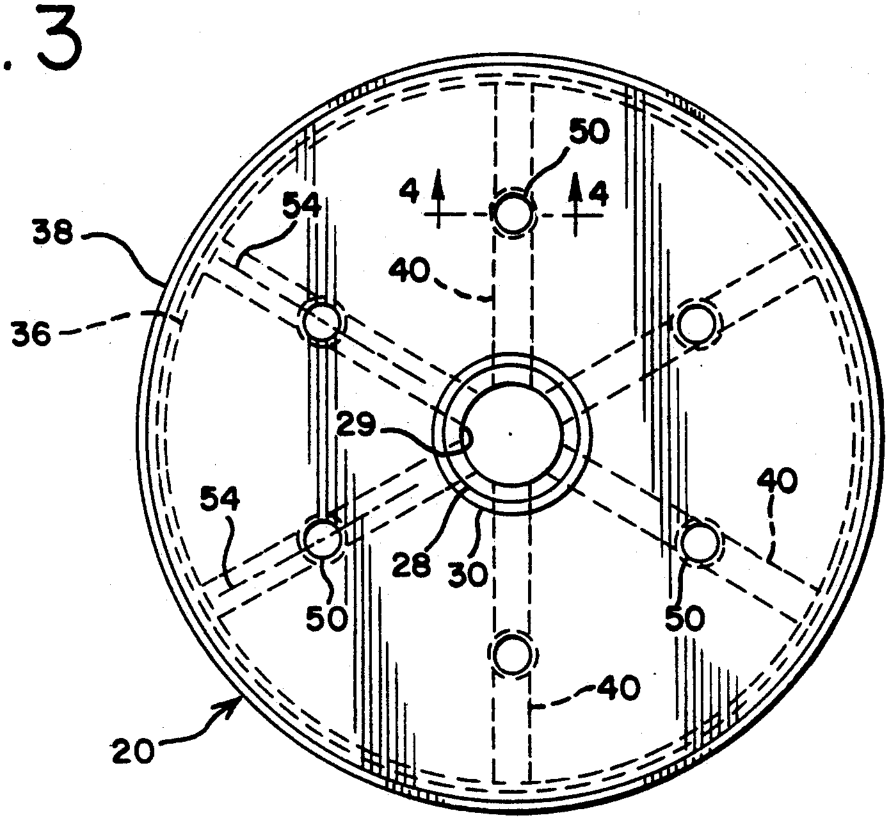
FIG. 4A
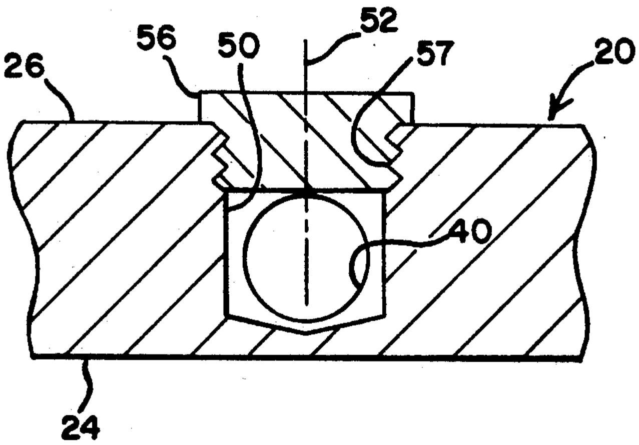
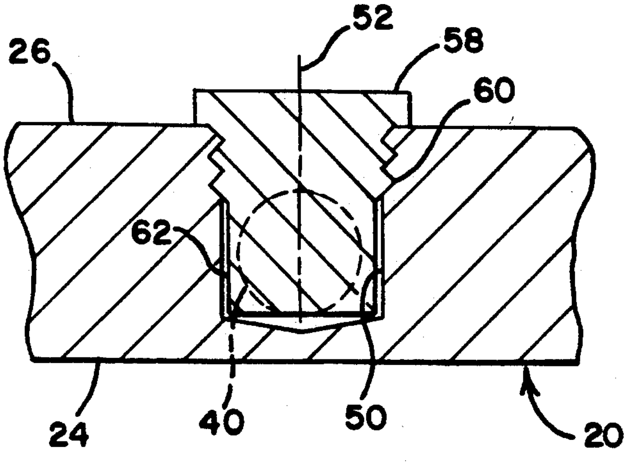
FIG. 4B

HEAT TRANSFER ROLL

The present invention relates to heat transfer rolls, and specifically to a method and apparatus for descaling channels within such heat transfer rolls.

BACKGROUND OF THE INVENTION

In the course of manufacturing of a web material such as a sheet plastic, paper, or the like, the material passes between one or more rolls which compress the material into the desired shape. In the course of manufacturing such web material, it is important to maintain the temperature of such rolls within narrow tolerances. The manufacture of some materials require the application of heat to the material from the roll, whereas other processes require that the roll cool, or chill the material. If the temperature of the roll is not properly monitored, the material being manufactured will not have the desired consistency and may, for example, stick to the roll and cause irregularities in the webbed product manufactured.

In order to maintain a roll at a desired temperature, such heat transfer rolls provide for a heating or a cooling liquid to be injected through a bore in the shaft at one end of the roll. The liquid is then directed through a plurality of spiralled channels positioned within the roll and adjacent the outer cylindrical surface thereof. After passing through the spiral channels across the length of the roll, the liquid is emitted through a second bore in the shaft at the opposite end of the roll.

The liquid, which is recycled through the channels of the roll, gradually deposits impurities in the channels of the roll, which is generally referred to as scaling. Over a period of time, the scaling within the channels of the roll will inhibit the flow of liquid therethrough and eventually it will not be possible to maintain the roll at the desired temperature, causing defects in the product manufactured. The scaling may occur evenly throughout the channels of the roll, or scaling may become concentrated in one or more channels and may ultimately result in altogether blocking one or more channels. When an operator cannot maintain the roll at the required temperature, the roll must be serviced, and the scaling within the channels removed.

Currently, such rolls can be descaled by injecting a cleaning chemical through the bore in the shaft at one end, through the channels, and out the bore in the opposing end. As the cleaning solution dissolves the accumulated material within the channels of the roll, the chemical makeup of the cleaning solution become altered, and to monitor the descaling certain chemical qualities, such as the pH of the discharged cleaning solution, are recorded. When it is apparent that the cleaning solution is no longer dissolving deposits, the channels are presumed to have been cleaned and the roll can be placed back in service.

Although rolls may generally be descaled as described above, the process consumes a considerable amount of time and chemicals. When, for example, scaling is concentrated in one or more channels, the cleaning solution will tend to freely and quickly flow through the open channels but move slowly through the congested channels, such that the cleaning of a congested channel may consume an inordinate amount of time and chemical. Furthermore, if one or more channels is completely clogged, the cleaning solution may fail to descale the channel altogether. In such cases, a service technician monitoring the discharge of cleaning solution may conclude that the channels of the roll have been descaled when, in fact, the problem is unsolved. When the scaling within the single channel of a roll totally blocks the movement of liquid therethrough, it may be necessary to disassemble the roll by removing the outer surface thereof to obtain access to the channels so that they may be manually descaled. This process, however, is extremely expensive and time consuming, and results in the entire rebuilding of the roll.

It would be desirable to provide a method and apparatus whereby a descaling and cleaning solution may be directed through any one of the plurality of channels in such heat transfer rolls such that the channels may be individually descaled.

SUMMARY OF THE INVENTION

Briefly, a heat transfer roll in accordance with the present invention has a generally hollow construction with first and second disc-shaped outer end sections each having a centrally located tubular shaft. An inner tubular body is fitted over the two outer end sections, and a plurality of spiral ribs extend from the first end to the second end of the inner tubular body. An outer tubular shell is fitted over the spiral ribs such that a plurality of spiral channels are formed between the inner tubular body and the outer tubular shell.

Each of the end sections has one or more passageways therein each of which is in communication with a centrally located axial hole or bore through the tubular shaft. Also, at each end of the inner tubular body, at least one hole is provided between each of the spiral ribs such that a liquid passing through the bore of the shaft and the passageway in the first or second outer end section can pass through the hole in the end of the inner tubular body. A liquid can therefore pass through the shaft of the first outer end section, through the passageway to a hole in the inner tubular body, through the spiral channels therein, and exit through a hole in the second end of the inner tubular body to a passageway in the second outer end section.

The present invention is embodied in a means positioned in one of the outer end sections for blocking a liquid from passing between the bore in the shaft thereof and the holes in the inner tubular body. In one embodiment of the present invention, the passageway in one of the end members is comprised of a plurality of radial holes or bores, each bore extending from the outer perimeter thereof to the central bore in the shaft thereof. A second plurality of blind transverse bores is provided in the end member, each of the second bores has an axis substantially parallel to the axis of the shaft and each of the second bores intersecting one of the radial bores therein. Each transverse bore has a diameter at least as large as the diameter of the associated radial bore and a removable cap is positioned at the outer end of each of the transverse blind bores. In this embodiment, a cleaning solution can be directed through a single spiral channel by removing the caps covering all but one of the blind bores and inserting a tubular plug into each of the uncapped blind bores to thereby block all but one of the radial bores. As a result, a cleaning liquid can only pass between the bore of the shaft and the hole in the inner tubular body leading to the spiral channel which remains unplugged.

In a second embodiment of the present invention, one of the outer end sections is comprised of a first and a second parallel planar member separated by a plurality of spacers. The passageway between the bore of the shaft and the inner tubular body is the space between the first and second parallel planar members. In this embodiment, the spacers are arranged such that liquid moving between the first and second planar members toward each one of the holes in the inner tubular body will pass through a constriction between two spacers, one constriction associated with each hole in the inner tubular body. A plurality of removable plugs are fitted in the outer of the first and second planar members, one plug being positioned over each constriction, which leads to a hole in the inner tubular body. In this embodiment, fluid moving between any one hole in the inner tubular body and the bore of the shaft may be blocked by the removal of the cap associated therewith and the insertion of a cylindrical plug which will block movement of the liquid through the constriction between spacers associated with the hole in the inner tubular body.

A heat transfer roll in accordance with the present invention may thereby be descaled by directing a cleaning solution under pressure into a single channel which is substantially blocked, or perhaps completely blocked. The roll can be descaled one channel at a time. A roll in accordance with the present invention can be descaled without using unnecessarily large amounts of cleaning solution and without consuming the time presently required to descale rolls. Furthermore, in most cases, it will not be necessary to disassemble a roll to descale a channel which has been completely blocked.

BRIEF DESCRIPTION OF THE DRAWINGS

A better understanding of the present invention can be reached by a reading of the following detailed description taken in conjunction with the drawings attached hereto wherein:

FIG. 3 is an end elevational view of the roll in FIG. 1 with radial borings therein shown in phantom lines;

FIG. 4A is an enlarged fragmentary cross-sectional view of the end member shown in FIG. 1 taken through lines 4—4 of FIG. 3, showing a cap over the transverse bore;

FIG. 4B is an enlarged fragmentary cross-sectional view of the end member shown in FIG. 1 also taken through lines 4—4 of FIG. 3 showing a plug fitted into the transverse hole shown therein;

DETAILED DESCRIPTION OF A PREFERRED EMBODIMENT

Figure 1:
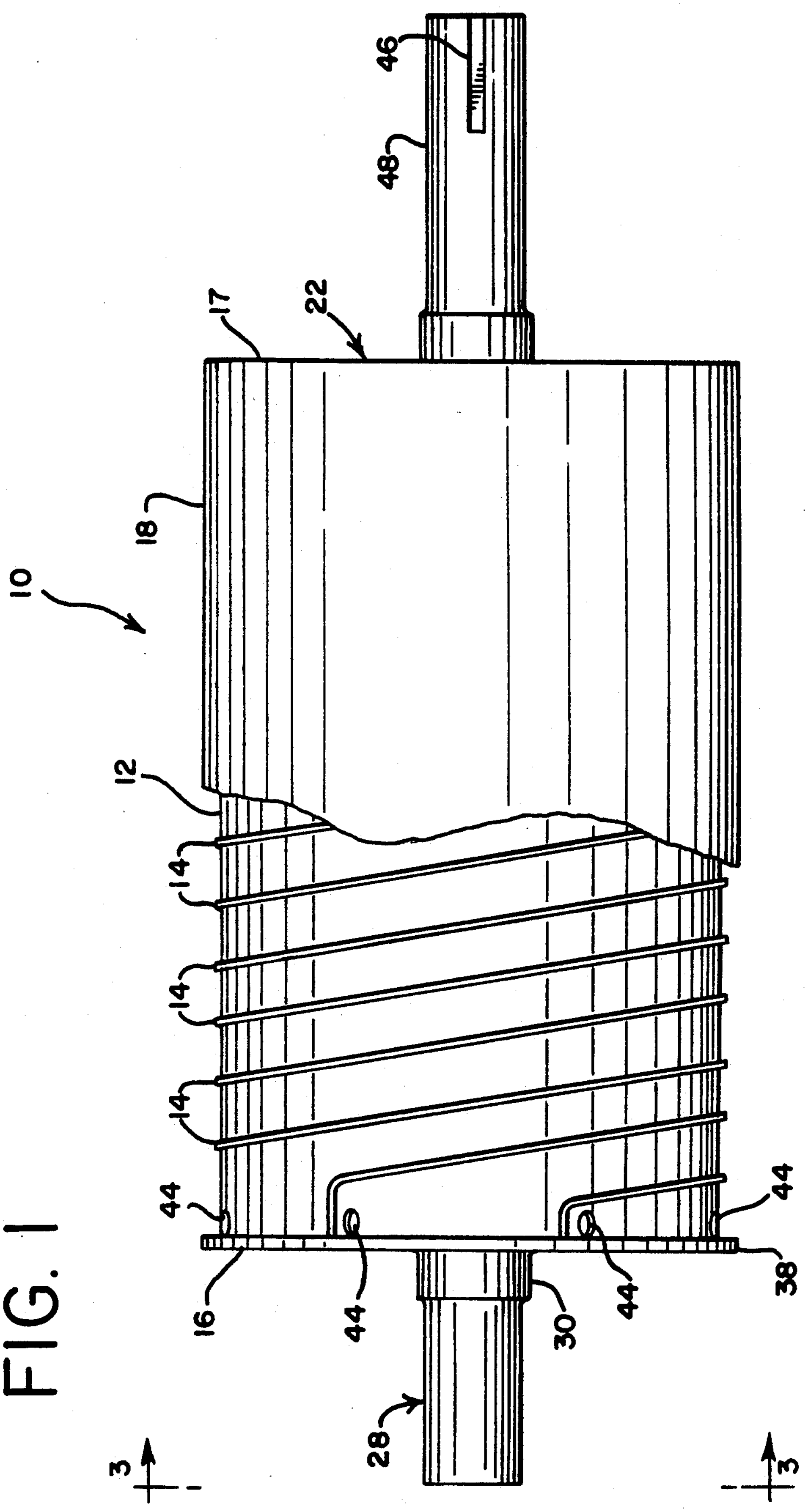
FIG. 1 is an elevational view of a heat transfer roll for which a portion of the outer cylindrical shell has been removed.
Figure 2:
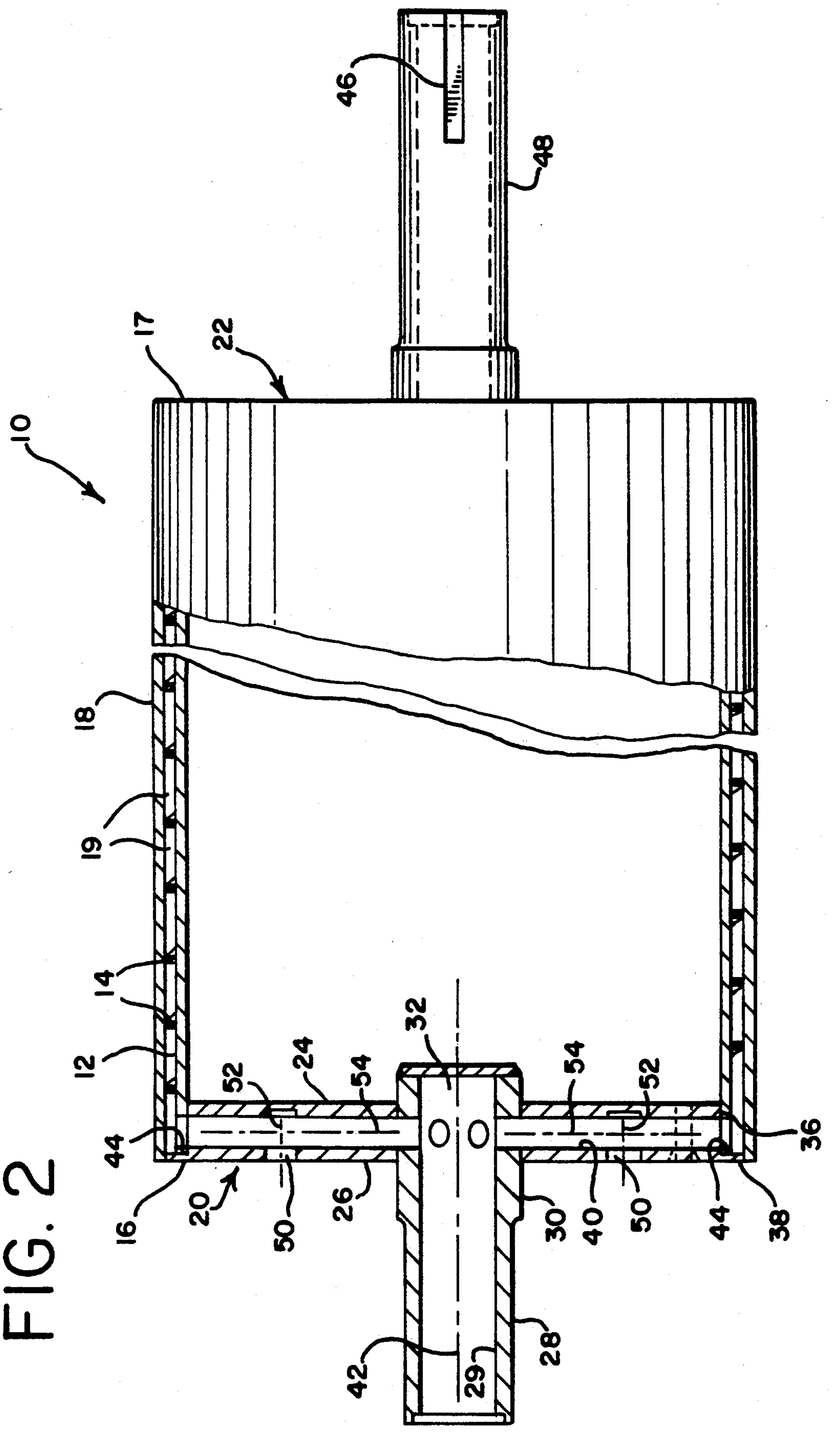
FIG. 2 is the heat transfer roll of FIG. 1 shown partially in elevational view and partially in cross-sectional view.

Referring to FIGS. 1, 2 and 3, a heat transfer roll 10 has an inner tubular body 12 and around the outer surface of the inner tubular body 12 is a plurality of spiral ribs 14—14. The spiral ribs 14—14 commence at the left first end 16 of the inner tubular body 12 and are positioned equally distant apart from one another around the circular first end 16, and spiral along the length of the inner tubular body 12 and end at the opposite second end 17 thereof. Fitted over the spiral ribs 14—14 is an outer tubular shell 18 such that a plurality of spiral channels 19—19 are formed between the inner tubular body 12 and outer shell 18 and between adjacent spiral ribs 14—14. A first end section 20 and a second end section 22 are fitted at each of the first and second ends 16, 17 of the roll 10. The first and second end section 20, 22 are substantially identical, except as specifically described herein, and the first end section 20 is representative of both. The first end section 20 has a cylindrical shape with parallel planar inner and outer surfaces 24, 26, respectively. Centrally located within the end section 20 is a tubular shaft 28 having an axial hole or bore 29 and having an enlarged hub section 30 which extends through the inner and outer surfaces 24, 26 thereof. An end plate 32 is positioned across the inner end of the axial bore 29 of the shaft 28. At its outer perimeter, the end section 20 has a cylindrical section 36 having a diameter equal to the inner diameter of the inner tubular body 12, such that the cylindrical section 36 of the end section 20 can be fitted therein. An outer flange 38 of the end member 20 abuts against the outer edge of the inner tubular body 12. The outer flange 38 has a diameter sized so as to be equal to the diameters of the outer edges of the spiral ribs 14—14 and the inner diameter of the outer shell 18 such that the outer shell 18 can be sealed against the ribs 14—14 and the outer flange 38 in accordance with methods known in the art.

Referring to FIG. 2 and FIG. 3, the end section 20 has a plurality of radial bores 40—40 which extend through the cylindrical section 36 between the inner and outer surfaces 24, 26 perpendicular to the axis 42 of the end section 20. Each bore 40—40 is aligned with a hole 44—44 through the wall of the inner tubular body 12, one hole 44 being positioned between each pair of ribs 14—14, and each bore 40—40 intersecting the axial bore 29 of the end section 20. As a result of the foregoing, there is a passageway between the axial bore 29 of the shaft 28 extending through the radial bores 40—40 to the holes 44—44 in the inner tubular body 12 such that liquid may pass between the axial bore 29 of the shaft 28 and each of the spiral channels 19—19 in the roll 10.

In the roll depicted in FIGS. 1, 2 and 3, the second end section 22 has all the features thus far describe with regard to the first end section 20. The second end section 22, as depicted herein, further has a key slot 46 in the tubular shaft 48 thereof such that the roll 10 may be driven from the second end 22.

As shown in FIGS. 2, 3, 4*a* and 4*b*, the present invention is embodied in a plurality of blind bores 50—50, each of which has an axis 52—52 substantially parallel to the axis 42 of the shaft 28. Each blind bore 50—50 is positioned such that the axis 52—52 thereof intersects the axis 54—54 of one of the radial bores 40—40 as best shown in FIGS. 3, 4*a* and 4*b*.

As shown in FIG. 4a, a threaded cap 56 is fitted into complementary threads 57—57 in each bore 50—50 when the roll 10 is in normal use. As shown in FIG. 4b, to prevent liquid from flowing between the axial bore 29 of the shaft 28 and one of the channels 19—19, one radial bore 40—40 may be closed by removing the associated threaded cap 56 and inserting in its place a cylindrical plug 58 having a threaded outer portion 60 which is complementary to the threads 57 in the bore 50 in the end section 20 for receiving the cap 56. The plug 58 also has a cylindrical body 62. The body 62 of the plug 58 has a length and diameter such that when the plug 58 is fitted into a blind bore 50 and the threaded portion 60 is threaded into the threads 57 of the bore 50, the cylindrical body 62 of the plug 58 will fit slideably into the bore 50 and entirely block the associated radial bore 40 and prevent liquid from flowing therethrough.

It is not necessary that the second end member 22 be provided with transverse bores 50 as is shown for the first end section 20 because the insertion of only one plug 58 is needed to block the flow of a liquid through an associated channel 19.

Figure 5:
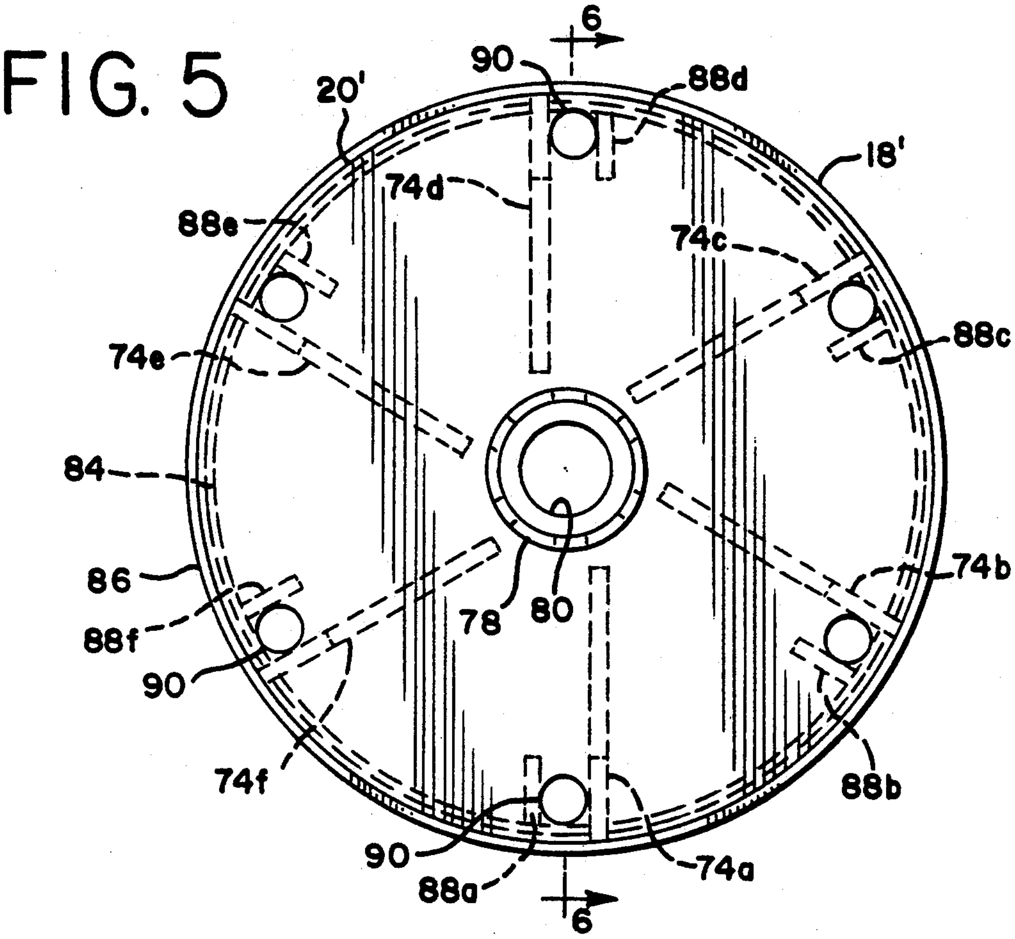
FIG. 5 is an elevational view of a second end member wherein the second end member is constructed of parallel planar members separated by spacers, and the spacers between the planar members are shown in phantom lines.
Figure 6:
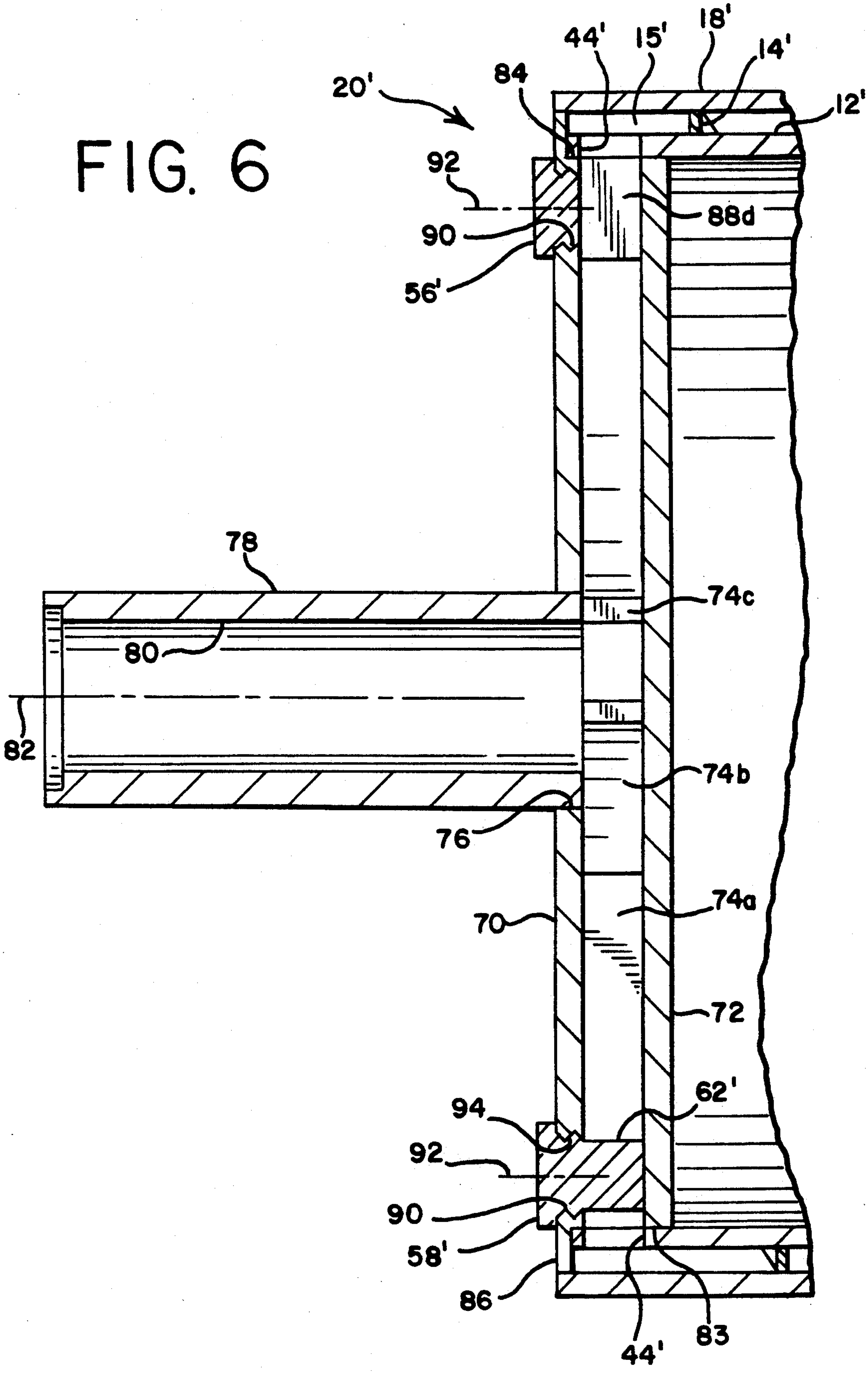
FIG. 6 is a cross-sectional view of the outer end section shown in FIG. 5 taken through lines 6—6 thereof showing one plug inserted therein.

An alternate embodiment of the first end member 20 is shown in FIG. 5 and FIG. 6. In this embodiment, the end member is designated as 20′, and portions of end member 20′ which are identical to those shown on the first end member 20 bear like indicia numbers except that they are primed.

In the second embodiment, the end member 20′ is comprised of an outer plate 70 and an inner plate 72 separated by a plurality of radial spacers 74. Centrally located within the outer plate 70 is a transverse hole 76 into which is fitted a tubular shaft 78 having an inner bore 80 and an axis 82. The tubular shaft 78 is welded within the transverse hole 76 to be securely attached thereto.

The inner plate 72 has a cylindrical outer edge 83 having a diameter which will fit slideably within the inner diameter of the inner tubular member 12′ and can be attached thereto by any suitable means such as welding. The outer plate 70 has a cylindrical edge section 84 which also has a diameter equal to the inner diameter of the inner tubular member 12′, and is coaxial the inner plate 72, and at the outer surface of the outer plate 70, has an outer flange 86 having a diameter equal to the inner diameter of the outer shell 18′. As can be seen in FIG. 6, the inner tubular member 12′ may therefore be fitted over the inner plate 72 and the cylindrical section 84 of the outer plate 70 and abut against the outer flange 86. The outer shell 18′ may be fitted over the outer diameter of the flange 86 and over the spiral ribs 14′—14′.

Long radial spacers 74a, 74b, 74c, 74d, 74e, 74f, referred to generally as "74", are positioned within the space within the inner and outer plates 72, 70 such that the outer end of one radial spacer 74 is adjacent to each of the holes 44′—44′ in the inner tubular body 12′. Liquid may therefore pass between a spiral channel 19′ and the bore 80 of the axial shaft 78 by passing through a hole 44′ in the inner tubular body 12′ and between the spacers 74.

In accordance with the present invention, a plurality of short radial spacers 88a, 88b, 88c, 88d, 88e, 88f, also referred to generally as 88, are positioned between the inner and outer plates 72, 70 with one short spacer 88 positioned adjacent each one of the holes 44′ in the inner tubular body 12′ opposing a long radial spacer 74. The outer end of each of the radial spacer 74, 88 abuts sealably against the inner surface of the inner tubular body 12′ such that liquid passing to or from each hole 44′ must pass through the constriction between the associated long and short radial spacers 74, 88.

The invention further includes a plurality of transverse holes 90—90 extending through the outer plate 70, each of the holes 90—90 being positioned such that the axis 92—92 thereof will extend between the long and short radial spacers 74, 88 associated with one hole 44′. Each of the transverse holes 90—90 has an outer threaded portion 94—94. As can be seen in FIG. 6, the transverse hole 90 shown in the upper portion thereof is fitted with a cap 56′ similar to the cap 56 described with reference to the first embodiment thereof, which has threads complimentary to the threads 94 in the transverse hole 90. As can be seen in the lower portion of FIG. 6, the constriction between the long and short radial spacers 74, 88 can be blocked by removing the associated cap 56′ and inserting a plug 58′ which is similar to the plug 58 of the first embodiment. In this embodiment, the plug 58′ has threads complimentary to the threads 92 in the transverse hole 90 and the tubular body 62′ of the plug 58′ has a diameter which will fit slideably within the transverse hole 90 and block the constriction between the long and short radial spacers, 74, 88.

Figure 7:
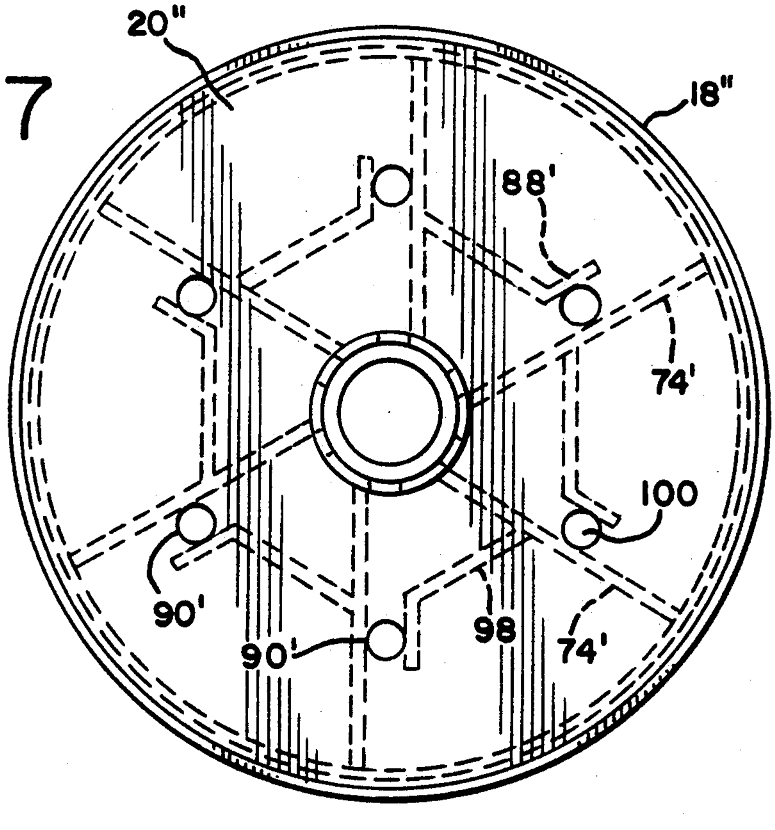
FIG. 7 is an elevational view of a third end member having parallel planar members separated by an alternate arrangement of spacers and with the spacers shown in phantom lines.

In the second embodiment, the spacers 74, 88 can be arranged in any of a number of configurations. In FIG. 7 there is shown an alternate configuration of spacers which would separate the inner and outer plates 72, 70. In the embodiment shown in FIG. 7, each short radial spacers 88′ is positioned near an associated long spacer 74′ radially inward from the position shown in the embodiment depicted in FIG. 5 and FIG. 6. In this embodiment, a plurality of connecting spacers 98 extend from the inner end of each of the short radial spacers 88′ and connect to a neighboring long radial spacer 74′. As a result, liquid moving between a hole 44′ in the inner tubular body 12′ and the axial bore 80 must pass between the constriction formed by the associated long and short radial spacers 74′, 88′ respectively. As in the second embodiment previously described, the end member 20″ has a plurality of transverse holes 90′—90′ each of which is positioned so that the axis 92′—92′ thereof extends between adjacent ones of long and short radial spacers 74′, 88′. A cap 56′ may be fitted across each of the transverse holes 90′—90′ when the roll 10 is in use, and a plug 58′ may be fitted into all but one of the holes 90′—90′ when one unblocked channel 19′ is to be descaled, as previously described.

In all of the embodiments, when it is desirable to descale a roll and direct a cleaning fluid through one of the channels 19, 19′, thereof, all the caps 56, 56′, thereof, except one can be removed and a plug 58, 58′ inserted into the hole 50, 90 previously occupied by a cap 56, 56′. When all the holes 50, 90 have been plugged except for one, a cleaning solution injected into the axial bore 29, 80 of a roll 10 will be directed into the single channel 19, 19′ which remains unblocked by a plug 58, 58′. As a result, cleaning solution may be forced by pressure through one channel and that channel will be descaled within a minimum of time. Thereafter, the descaled channel may be blocked and another channel unblocked, and the process repeated until all of the channels 19, 19′ have been descaled. Furthermore, it will generally not be necessary to disassemble a roll 10 if one of the channels 19, 19′ becomes completely blocked as has been necessary with prior rolls. There is accordingly described herein a roll 10 which may be readily descaled and serviced with a minimum of time and expense.

While the present invention has been described in connection with two embodiments, it will be apparent to those skilled in the art that many modifications and changes thereto may be made without departing from the true spirit and scope of the invention. Therefore it is intended by the dependent claims to cover all such changes and modifications which come within the true spirit and scope of the invention.

What is claimed is:

1. A heat transfer roll comprising in combination:
an inner tubular body having an end, a wall, and an outer surface,
a plurality of ribs on said outer surface of said inner tubular body,
an outer tubular shell fitted over said ribs to form a plurality of channels between said inner tubular body and said outer tubular shell,
an end section fitted into said end, said end section having a central opening and a passageway extending from said central opening to each of said spiral channels for conducting a fluid from said central opening to each of said channels, and,
means for individually blocking the flow of fluid to any one of said spiral channels.

2. The combination in accordance with claim 1 wherein said passageway comprises a plurality of radial holes and said means for blocking comprises a means for blocking any one of said radial holes.

3. The combination in accordance with claim 2 wherein said means for blocking comprises a plurality of second holes, each of said second holes having an axis transverse to a central axis of one of said radial holes, and
a removable plug for blocking said one of said radial holes when said plug is fitted into said second holes associated with said one of said radial holes.

4. The combination in accordance with claim 1 further comprising:
said end section having an inner member and an outer member spaced from said inner member to form said passageway therebetween,
said inner tubular body having a plurality of holes therein for communication between said passageway and said channels, and
means for blocking one of said plurality of holes preventing communication between said passageway and one of said channels through said one of said plurality of holes.

5. The combination in accordance with claim 4 further comprising,
a plurality of first spacers positioned in said passageway, each of said first spacers extending between inner member and said outer member and abutting said inner tubular body adjacent one of said plurality of holes,
a plurality of second spacers positioned in said passageway, each of said second spacers extending between said inner member and said outer member,
each of said second spacers positioned near one of said first spacers and forming a constriction through which liquid passing through said one of said plurality of holes adjacent said first spacer must flow, and
means for blocking said constriction so as to prevent liquid from communicating between said passageway and said channels through said one of said plurality of holes.

6. The combination in accordance with claim 5 wherein said means for blocking said constriction comprises a plug which may be removably fitted into said constriction.

7. A heat transfer roll comprising in combination:
an inner tubular body having two ends and an outer surface,
a plurality of ribs on said outer surface of said inner tubular body,
a tubular shell fitted over said ribs to form a plurality of channels between said inner tubular body and said outer tubular shell,
a first and a second outer end section, one of said first and said second outer end sections fitted at each of said two ends,
each of said first and said second outer end sections having a central opening and a passageway extending from said central opening to said plurality of channels such that liquid may flow between said inner bore and said plurality of channels through said passageway,
means for individually blocking said passageway for preventing a liquid from passing between one of said channels and said central opening of one of said first and said second outer end section.

8. In a heat transfer roll having a tubular body, an outer surface, an end, and a central opening in said end, and having a plurality of passageways in communication with said central opening, and portions of said passageways positioned adjacent said outer surface, the improvement comprising:
means for individually blocking one of said passageways to prevent the passage of a liquid therethrough.

9. A heat transfer roll comprising in combination:
a cylindrical body having two ends, an outer surface, and an axial opening in one of said ends,
a plurality of channels adjacent said outer surface of said cylindrical body, each of said channels in communication with said axial opening, and
means for individually blocking a liquid from passing through said axial opening and one of said channels.

* * * * *